May 7, 1940.  C. H. WIDMAN  2,199,382
SEAT CONSTRUCTION
Filed Nov. 11, 1937
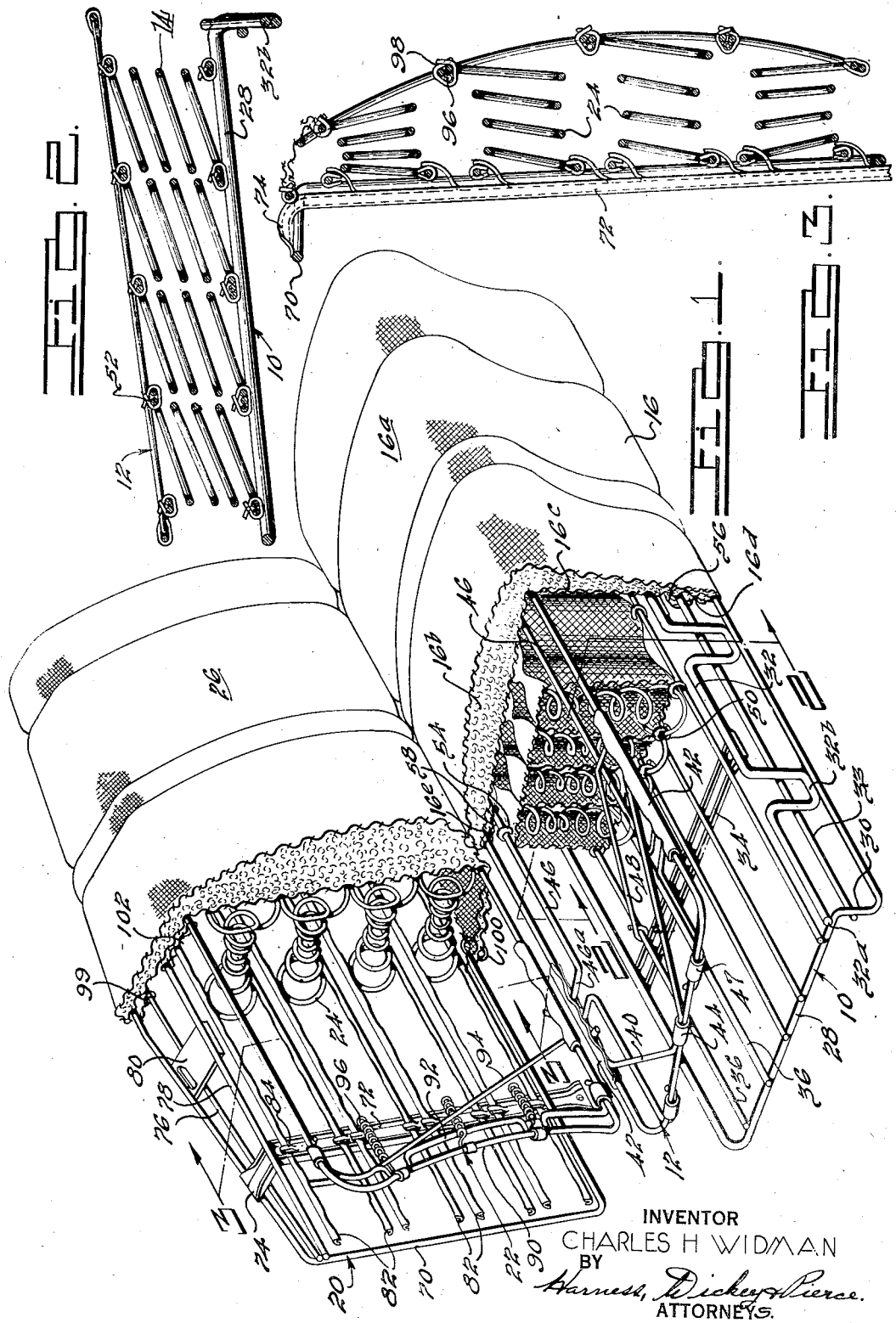
INVENTOR
CHARLES H WIDMAN
BY
Harness, Dickey & Pierce.
ATTORNEYS.

Patented May 7, 1940

2,199,382

UNITED STATES PATENT OFFICE 2,199,382

SEAT CONSTRUCTION

Charles H. Widman, Detroit, Mich., assignor to The Murray Corporation of America, Detroit, Mich., a corporation of Delaware Application November 11, 1937, Serial No. 173,977

6 Claims. (Cl. 155—179)

The present invention relates to seat constructions and in particular provides a seat construction embodying an improved frame structure and an improved arrangement for securing the spring mechanism and the trim material to the frame.

Objects of the present invention are to provide an improved seat construction, particularly adapted for automobiles or the like, characterized broadly as embodying a frame structure formed of wire or rod-like stock; to provide such a seat construction which may be characterized as one in which the trim material may be secured to the frame without the necessity of the usual tacking operation; and to provide such a seat construction which may be characterized as embodying improved means for securing the spring mechanism to the frame structure.

Further objects of the present invention are to provide a frame structure for a seat construction or the like formed of wire or rod-like stock, having wire or rod-like reinforcing elements permanently secured thereto; to provide such construction in which the spring mechanism is connected between supplemental upper and lower frame members by means of hog rings or the like; to provide such construction in which the trim material is connected to the frame structure by means of hog rings or the like; and to provide such construction which may be readily and economically manufactured and assembled and which is exceedingly efficient in service.

With the above as well as other objects in view, which appear in the following description and in the appended claims, a preferred but illustrative embodiment of the invention is shown in the accompanying drawing throughout the several views of which corresponding reference characters are used to designate corresponding parts, in which:

Fig. 1 is a view in perspective, with certain parts broken away, of a seat construction embodying the invention;

Fig. 2 is a view in vertical transverse section, taken along the line 2—2 of Fig. 1; and, Fig. 3 is a view in vertical transverse section taken along the line 3—3 of Fig. 1.

It will be appreciated from a complete understanding of the invention that the improvements thereof may be embodied in seat constructions of widely differing form and intended for widely differing purposes. In its preferred form, however, the invention is adapted for use as an automobile seat, and by way of illustration but not of limitation, this preferred form is specifically illustrated and described herein.

Referring to the drawing, the improved seat comprises generally a seat member and a back member. The seat member comprises a lower frame member 10, an upper frame member 12, suitable coil spring mechanism 14, and a trim pad 16. Similarly the back member comprises generally a frame member 20, a frame member 22, suitable coil spring mechanism, and a trim pad 26.

The lower frame member 10 is of generally rectangular shape and is preferably formed of a single continuous length of relatively heavy wire or rod-like stock 28. The front portion of the member 28 is downwardly bent as indicated at 30, to provide a flange which gives additional depth to the front part of the seat. This flange is reinforced by a length of wire or rod-like stock 32, the opposite ends 32a of which are suitably secured as by welding to the ends of the member 28, and the offset portions 32b may be correspondingly secured to the base of the flange. Additional reinforcing is provided by the element 33, which is permanently connected to the frame 28 and to the reinforcing member 32.

The lower frame member 10 is transversely reinforced by a plurality of substantially parallel spaced members 34, the rear ends of which are secured to the rear edge of the frame 10 and the front ends of which are secured to the reinforcing member 32. Longitudinal reinforcement for the lower frame member 10 is provided by a plurality of longitudinally extending reinforcing rods 36, the respectively opposite ends of which are suitably secured as by a spot welding operation to the end portions of the frame 28 and intermediate points along which are connected as by welding to the transverse reinforcing members 34.

The upper frame member 12 may and preferably does comprise a single length of wire or rod-like stock formed into generally rectangular shape. Reinforcing for the corners of the upper frame member 12 is provided by the corner reinforcing rods 40 which are of generally V-shape. The ends of the rods 40 are secured to the side portions of the frame 12 as by the conventional channel bracket 42, and the intermediate portions thereof are secured to the corresponding end portion of the frame 12 by a conventional clip or ring 44. Longitudinal reinforcing of the frame 12 is provided by the longitudinally extending reinforcing rods 46 which are positioned relatively close to the side portions of the frame 12. The ends of the reinforcing rods 46 are secured to the corresponding end portions of the frame 12 as by the rings 47, and these rods are provided with rectangular offsets 46a, which are secured to the side portions of the frame 12 by the previously mentioned channel brackets 42. In addition to the foregoing reinforcing members, the seat structure is preferably provided with one or more sway reinforcing bars such as 48, which may be distributed throughout the length of the frame, and extend from one of the elements associated with the lower frame to one of the elements associated with the upper frame and positioned at the opposite side of the structure. As shown, each reinforcing rod 48 extends from one of the rods 36 at the rear of the frame to the front side portion of the frame 12.

The coil springs 14 may be and preferably are arranged in conventional burlap pockets which are nested together to form a nested spring assembly. The thus assembled springs 14 are positioned upon the lower frame structure 10, and are secured thereto, as by hog rings 50, which are passed around the lower ends of adjacent springs and also around the adjacent reinforcing rods 36. The upper ends of adjacent springs in each nested formation are connected together as by means of hog rings 52 (Fig. 2). The upper end of each extreme front and rear coil spring 14 is connected to the adjacent longitudinal upper reinforcing rod 46 in a corresponding manner, hog rings 54 being shown for this purpose.

The trim pad 16 may be and preferably is conventionally constructed to include an outer trim cloth 16a, a cotton bat 16b, and an inner or backing cloth 16c. The outer marginal edges of the trim pad 16 are provided with flap-like portions which are adapted to be stretched around and behind the corresponding parts of the seat frame 10. The front flap portion is designated as 16d and is illustrated as turned behind the corresponding part of the frame 10 and connected to the previously mentioned reinforcing rod 33 by means of a hog ring. The rear flap portion is designated as 16e and is correspondingly turned behind the rear edge of the upper frame member 12 and connected to the rear reinforcing rod 46 by means of a hog ring 58.

It will be appreciated that the just described frame construction may be readily and economically manufactured and assembled. At the same time, an extremely desirable construction is provided. The upper and lower frame members may be constructed to embody in themselves a suitable degree of strength and at the same time to embody a certain amount of resilience. The connection between the spring mechanism and the upper and lower frame members are extremely simple and yet provide a permanent and effective connection. The trim material, which overlies the frame members, is required to be connected to the frame only along the marginal edges.

The back frame member 20 is preferably, but not necessarily constructed of a continuous length of relatively heavy wire or rod-like stock 70, the upper edge of which is offset from the general plane of the frame 20 so as to give a desired depth and configuration to the top of the seat back. Transverse reinforcement for the back is provided by a plurality of substantially parallel spaced members 72 the lower ends of which are connected to the lower portion of the frame 20 in any suitable way and the upper ends of which are rearwardly bent as indicated at 74 to reinforce the offset portion of the frame 20. Further reinforcement for this offset portion is provided by a plurality of longitudinal reinforcing rods 76 and 78 which extend between the two ends of the frame 20 and by intermediate connecting plates 80. Plates 80 are secured to offset portion of the frame 20 and also to the reinforcing rods 76 and 78.

Longitudinal reinforcing for the frame member 20, as well as the support for the corresponding ends of the coil springs 24, is provided by a plurality of pairs of channel elements 82. The channel elements 82 are secured to the transverse reinforcing elements 72 by tongues 84 struck upwardly from the surfaces of these members. The tongues 84 may, as will be appreciated, be bent down during assembly so as to clamp the channels 82. The ends of the springs 24 are received within the channel members 82 and thereafter the flanges of these channels are bent inwardly to clamp the spring ends in a conventional manner, thus providing a firm support for the springs.

The front frame member 22 preferably is formed of a continuous length of relatively heavy wire or rod-like stock 90, of generally rectangular shape, and with a suitably arched surface. The frame 22 is reinforced at its ends by reinforcing members 92 which are secured thereto in a manner similar to that described with reference to the reinforcing members 40. Preferably, and as illustrated, sway rods 94 extend between the frame members 22 and 20 so as to suitably limit lateral movement of these frames relative to each other.

In order to anchor the front ends of the springs 24, the front frame member 22 is provided with a plurality of longitudinally extending relatively light coil springs 96, the opposite ends of which are hooked over the end portions of the frame 22. As clearly appears in Fig. 3, the ends of adjacent springs and the corresponding longitudinally extending coil springs 96 are secured together by hog rings 98. This arrangement permits the entire body of springs 24 to work or flex to some extent both laterally and longitudinally of the seat back and at the same time retains the spring mechanism in unit form.

The trim pad 26 is secured over the seat back in a manner corresponding to that described with reference to the seat portion. Specifically a plurality of hog rings such as 99 are provided to secure one flap of the trim pad 26 to the reinforcing rod 76. A corresponding series of hog rings 100 may be provided to secure the lower flap of the pad 26 to the lower edge of the frame 20. The connections between the ends of the pad 26 and the end portions of the frame 20 correspond to the last mentioned connections. In order to impose a suitable limit to the expansion of the springs 24, suitable loops such 102 of burlap or the like may be connected between the frame members 20 and 22.

Although only one specific embodiment of the invention has been described in detail it will be appreciated that various modifications in the form and arrangement thereof may be made within the spirit and scope of the invention.

What I claim is:

1. A seat construction having a base frame member formed of a substantially continuous length of rod-like stock extending around the marginal edge of the frame, said stock being laterally bent from the general plane of the frame along at least a portion thereof to form a flange, and a reinforcing element connected to said frame member so as to span said deflected part.

2. A seat construction having a base frame member formed with a flange along one side extending laterally from the general plane of the frame member, said frame member being formed of a substantially continuous length of rod-like stock extending around the marginal edge of the frame, the part of said stock along said one side being bent to form the edge of the flange, and an element extending along said one side for defining the junction between said flange and the general plane of the frame member.

3. A seat construction having a base frame member formed with a flange along one side extending laterally from the general plane of the frame member, said frame member being formed of a substantially continuous length of rod-like stock extending around the marginal edge of the frame, the part of said stock along said one side being bent to form the edge of the flange, and an element extending along said one side for defining the junction between said flange and the general plane of the frame member, said element being connected to the ends of the frame member.

4. A seat construction having a base frame member formed with a flange along one side extending laterally from the general plane of the frame member, said frame member being formed of a substantially continuous length of rod-like stock extending around the marginal edge of the frame, the part of said stock along said one side being bent to form the edge of the flange, and an element extending along said one side for defining the junction between said flange and the general plane of the frame member, said element being connected to the ends of the frame member and being formed for connection at at least one intermediate point directly to said deflected part of the frame member.

5. A seat construction having a base frame member formed with a flange along one side extending laterally from the general plane of the frame member, said frame member being formed of a substantially continuous length of rod-like stock extending around the marginal edge of the frame, the part of said stock along said one side being bent to form the edge of the flange, and an element extending along said one side for defining the junction between said flange and the general plane of the frame member, said element being connected to the ends of the frame member and being formed for connection at at least one intermediate point directly to said deflected part of the frame member, and additional reinforcing elements extending across said frame member.

6. A seat construction having a base frame member formed with a flange along one side extending laterally from the general plane of the frame member, said frame member being formed of a substantially continuous length of rod-like stock extending around the marginal edge of the frame, the part of said stock along said one side being bent to form the edge of the flange, and an element extending along said one side for defining the junction between said flange and the general plane of the frame member, and reinforcing members extending across said seat construction, certain of said reinforcing members forming a spacing connection between said element and said deflected part of the frame member.

CHARLES H. WIDMAN.